United States Patent [19]

Tipton

[11] Patent Number: 4,986,403

[45] Date of Patent: Jan. 22, 1991

[54] MULTI-STAGE MOTORCYCLE SLIDER CLUTCH

[76] Inventor: Kenneth L. Tipton, 1031 Fairlawn Dr., Rockledge, Fla. 32955

[21] Appl. No.: 488,212

[22] Filed: Mar. 5, 1990

[51] Int. Cl.⁵ .................... F16D 13/42; F16D 25/14; F16D 43/12
[52] U.S. Cl. ........................ 192/70.11; 192/85 CA; 192/105 C; 192/105 F; 192/114 R
[58] Field of Search ............... 192/70.11, 70.22, 70.3, 192/83, 85 CA, 89 W, 96, 105 C, 105 F, 106 R, 114 R

[56] References Cited

U.S. PATENT DOCUMENTS

| | | | |
|---|---|---|---|
| 1,035,535 | 8/1912 | Coleman | 192/105 C |
| 1,743,170 | 1/1930 | Vail | 192/105 C |
| 4,111,291 | 9/1976 | Horstman | 192/105 C |
| 4,566,577 | 1/1986 | Tsuboi | 192/85 CA |
| 4,732,251 | 3/1988 | Tipton | 192/70.24 |

Primary Examiner—Rodney H. Bonck
Assistant Examiner—Nicholas Whitelaw
Attorney, Agent, or Firm—Gordon K. Anderson

[57] ABSTRACT

An improved motorcycle slider clutch which utilizes several original equipment manufacturers components, also an aftermarket basket (34) and a housing gear assembly (44). A pressure plate (100) engages the nest of discs (32) when compressed by a number of fingers (114) configured to create linear force when subjected to centrifugal action. A flange (110) encloses the basket (34) and retains the fingers. A cast cover (128) contains a pneumatic cylinder with a piston (140) that restrains movement of the plate in the first stage of actuation and a second piston (156) in a chamber created by a hollow cap (154) providing similar restraint for a second stage. The operation is controlled pneumatically with solenoid valves (146) and a millisecond timer (168) allowing a multi-stage starting sequence at a timed interval.

12 Claims, 4 Drawing Sheets

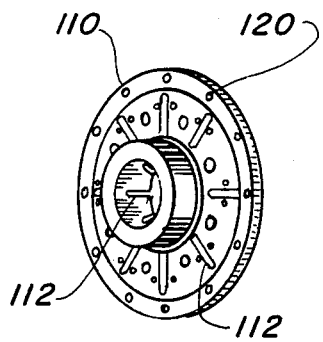
FIG. 11
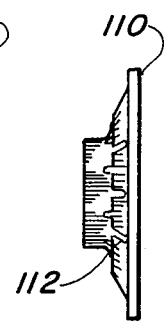
FIG. 12
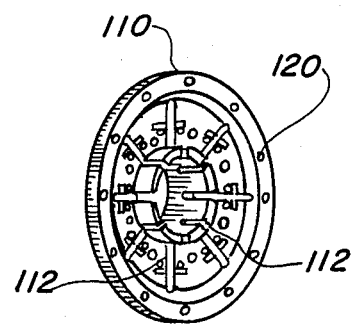
FIG. 13
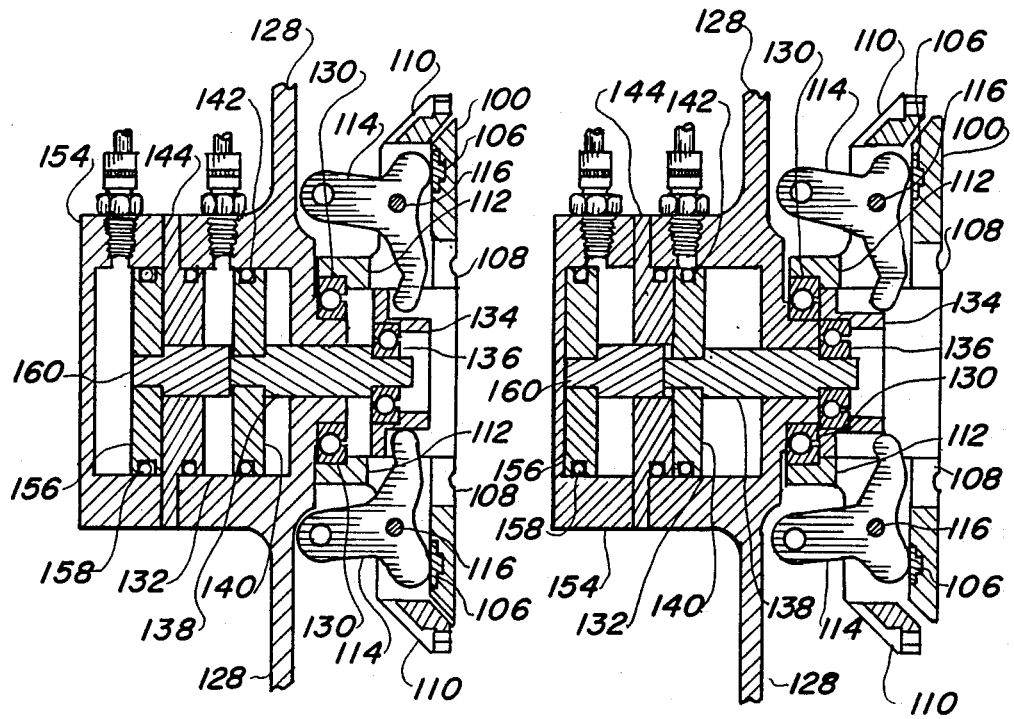
FIG. 14
FIG. 15

MULTI-STAGE MOTORCYCLE SLIDER CLUTCH

TECHNICAL FIELD

The present invention relates to centrifugal clutches for motorcycles in general, and more specifically to electro-pneumatically actuated slider clutches operating in racing environments.

BACKGROUND ART

In the so-called drag racing sport for motorcycles, the use of a centrifugal clutch has predominated the art due to its superiority in regulated speed engagement and slip control. Developments to improve this type of clutch are continually being pursued many times based on improvements in existing designs. Dry types of clutches have been employed in the past using materials with a high coefficient of friction for this purpose, however, the motorcycle must be extensively modified making the approach expensive and time consuming.

A search of the prior art did not disclose any patents that read directly on the claims of the instant invention, however, the following U.S. patents were considered related:

| Patent No. | Inventor | Filing Date |
|---|---|---|
| 4,732,251 | Tipton | Mar. 22, 1988 |
| 4,566,577 | Tsuboi | Jan. 28, 1986 |
| 4,111,291 | Horstman | Sep. 5, 1976 |
| 1,743,170 | Vail | Jan. 14, 1930 |
| 1,035,535 | Coleman | Aug. 13, 1912 |

U.S. Pat. No. 4,732,251 issued to the present inventor is the art upon which the instant invention is based. The ability to employ existing components from the motorcycle manufacturer and the addition of a basket with a housing gear assembly taught in this prior art patent allows improvements to be made that creates unique multistage control of the function of the slider clutch. Since the inside pressure plate is different and the outside slider plate is replaced and new elements have been added to control function, no anticipation or obviousness with this patent exists.

Tsuboi discloses a clutch release device for motorcycles using a manual actuated hydraulic system in which a push rod is arranged to extend through the main shaft with a pressure plate on each end. One end is arranged to interface with a hydraulic cylinder and the other with the clutch disc pressure plate. It is noted, however, that no centrifugal action is used by this invention and it is assigned to the motorcycle original equipment manufacturer.

Horstman teaches a centrifugal clutch for go-carts and employs weights or stampings that pivot against a plate compressing discs together for engagement, depending upon rotational speed.

Vail uses centrifugal weights forcing separable plates together against adjustable spring pressure, further allowing manually operated means to relieve the pressure on the weights forcing them into an inoperable position allowing shifting of gears.

For background purposes and as indicative of the art to which the invention relates, reference may be made to the remaining cited patents.

DISCLOSURE OF THE INVENTION

Racing slider clutches have been placed in an environment that is highly competitive and improvements are extremely important, as races are won by fractions of a second. The inventors prior U.S. Pat. No. 4,732,251 has revolutionized the state of the art, however, some drawbacks have limited the ultimate potential of the device. The present invention employs many of the same components of the motorcycle as before and some elements of the prior invention also adding an entirely new control system providing multiply distinct stages of operation.

It is, therefore, the prime object of the invention to employ three separate stages, including a warm-up stage of operation, which allows the engine to be tuned or run in at any speed without the clutch being actuated. In this stage, counterbalanced fingers used to provide linear force from centrifugal action for engagement are mechanically locked-up at the pressure plate, therefore, regardless of amount of pressure exerted on the plate, the clutch will not engage. It is obvious the advantage this improvement has during this initial operation condition.

The primary or first stage of actuation partially engages the clutch allowing the motorcycle to leave the line quickly without overcoming the coefficient of friction between the tires and the track unnecessarily spinning the wheels. This initial stage must balance the engine torque precisely taking into account the combined weight of the driver and motorcycle and the power of the engine, so as not to loose the desired traction. Further, the engagement time is critical, as the actuation must commence at the instant moment of release. This object is accomplished by restraining the pressure plate, using an integral pneumatic cylinder for the warm-up stage, and then rapidly releasing the pressure through the use of a 3-way solenoid valve with a quick dump, allowing the already available force of the fingers to immediately engage the pressure plate with the clutch discs. It may be further understood that the instant human reaction force and mechanical linkage time is completely minimized, again improving the crucial response at the instant moment. This primary stage also places a limit on the movement of the pressure plate, so as to allow only the exact amount of pressure to be utilized during the given starting time sequence.

The fully engaged stage (second stage of operation) releases pneumatic pressure in a controlled bleeded down manner, to a second integral cylinder removing the final restriction allowing the full travel of the pressure plate. This staged control is accomplished automatically once the sequence is started, allowing the driver to concentrate on other matters. It may be clearly seen how this improvement allows optimum release of torque from the engine to the wheel over a timed interval, creating the desired result, not only with the initial start, but through the first decisive distance of travel.

An important object of the invention is in the simplicity of the improvement using the same elements of the motorcycle manufacturer, as utilized with the inventors previous patent and part of the aftermarket components that are already tooled and in operation. The change takes place from the pressure plate outward with the addition of the pneumatic system into the clutch housing cover and the ancillary components to operate the system.

Another object of the invention allows adjustable timing between stages of operation to optimize the release sequence. This object is accomplished using an adjustable millisecond timer to actuate the second solenoid valve, creating an ideal situation, balancing all of the input from the specific motorcycle and operating environment to create the most favorable condition. Further, for flexibility, the size of the orifice in the second solenoid valve may be easily changed altering the bleed down time of the solenoid. Finally, the fingers may be changed in configuration to react to a specific rotational speed, allowing further incremental adjustment and related slip factor by selecting matched components that have different performance characteristics creating a smooth release of pressure throughout the entire process. Weights may be added to the outstanding leg of the counterbalanced fingers also altering the clutch performance.

Yet another object of the invention allows no change to be required in the motorcycle lubrication system as the entire clutch remains inside the housing lubricated by the existing system. It is well known that dry clutches create structural problems in that considerable modification to the motorcycle is necessary and oil seals are required if the clutch is externally mounted.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 11 is a partial isometric view of the basket enclosing flange viewed from the clutch side, completely removed from the invention for clarity.

FIG. 12 is a side view of the basket enclosing flange completely removed from the invention for clarity.

FIG. 13 is a partial isometric view of the basket enclosing flange viewed opposite the clutch side, completely removed from the invention for clarity.

FIG. 14 is a cross-sectional view, as in FIG. 1, of the invention with the pneumatic actuating means in the primary or first stage position when the pressure plate is allowed to move within limited bounds in response to the action of the fingers.

FIG. 15 is a cross-sectional view, as in FIG. 1, of the invention with the pneumatic actuating means in the second or fully engaged stage allowing full force of the fingers to be applied to the pressure plate.

BEST MODE FOR CARRYING OUT THE INVENTION

Figure 1:
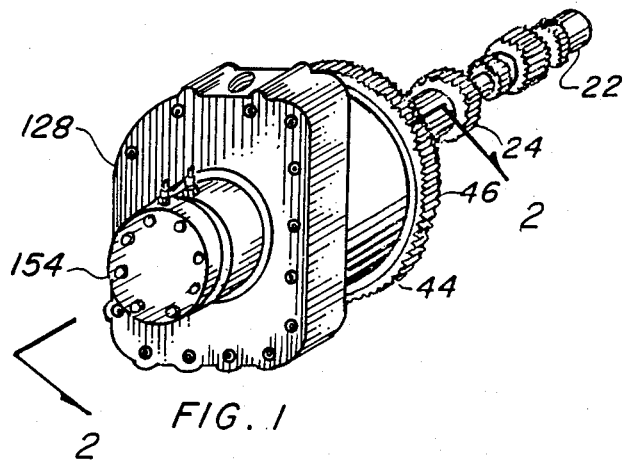
FIG. 1 is a partial isometric view of the preferred embodiment removed from the motorcycle less the peripheral equipment for actuating the pneumatic system.
Figure 2:
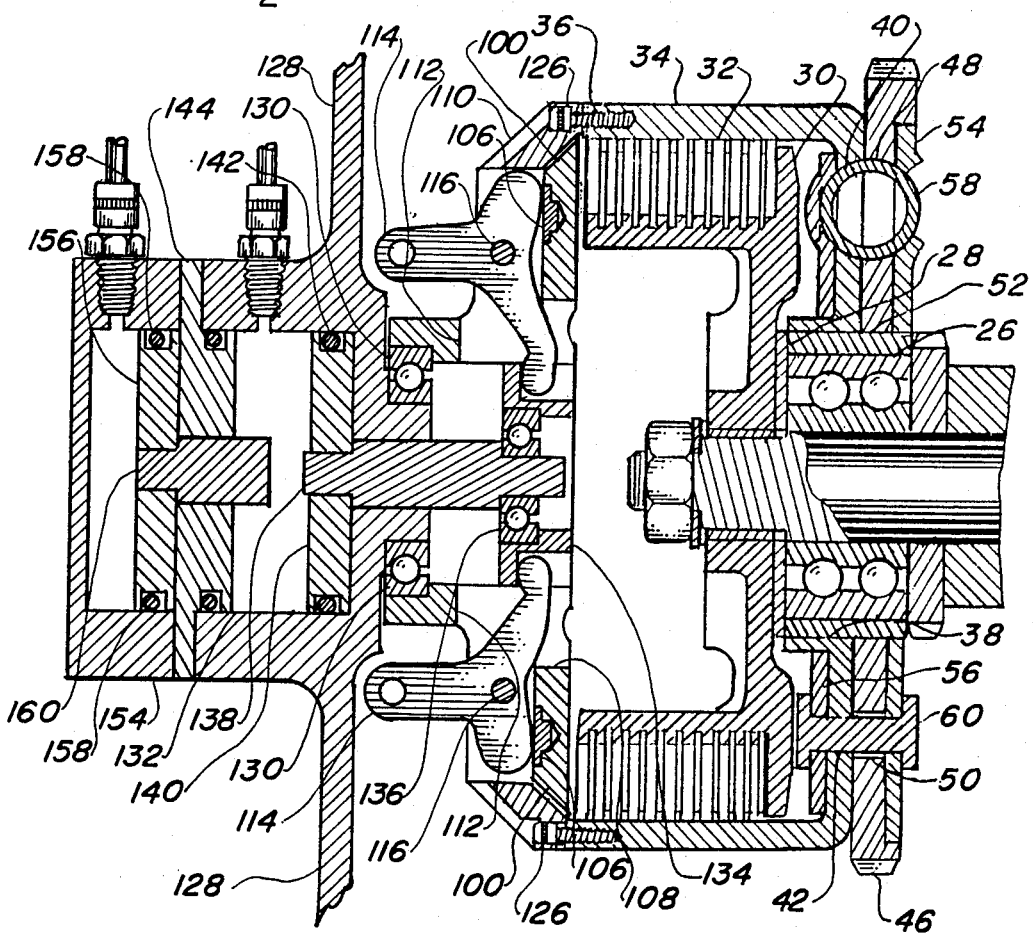
FIG. 2 is a cross-sectional view taken along lines 2—2 of FIG. 1 illustrating the interior of the clutch with the hydraulic system in the warm-up or locked-up position isolating the clutch from engagement.
Figure 3:
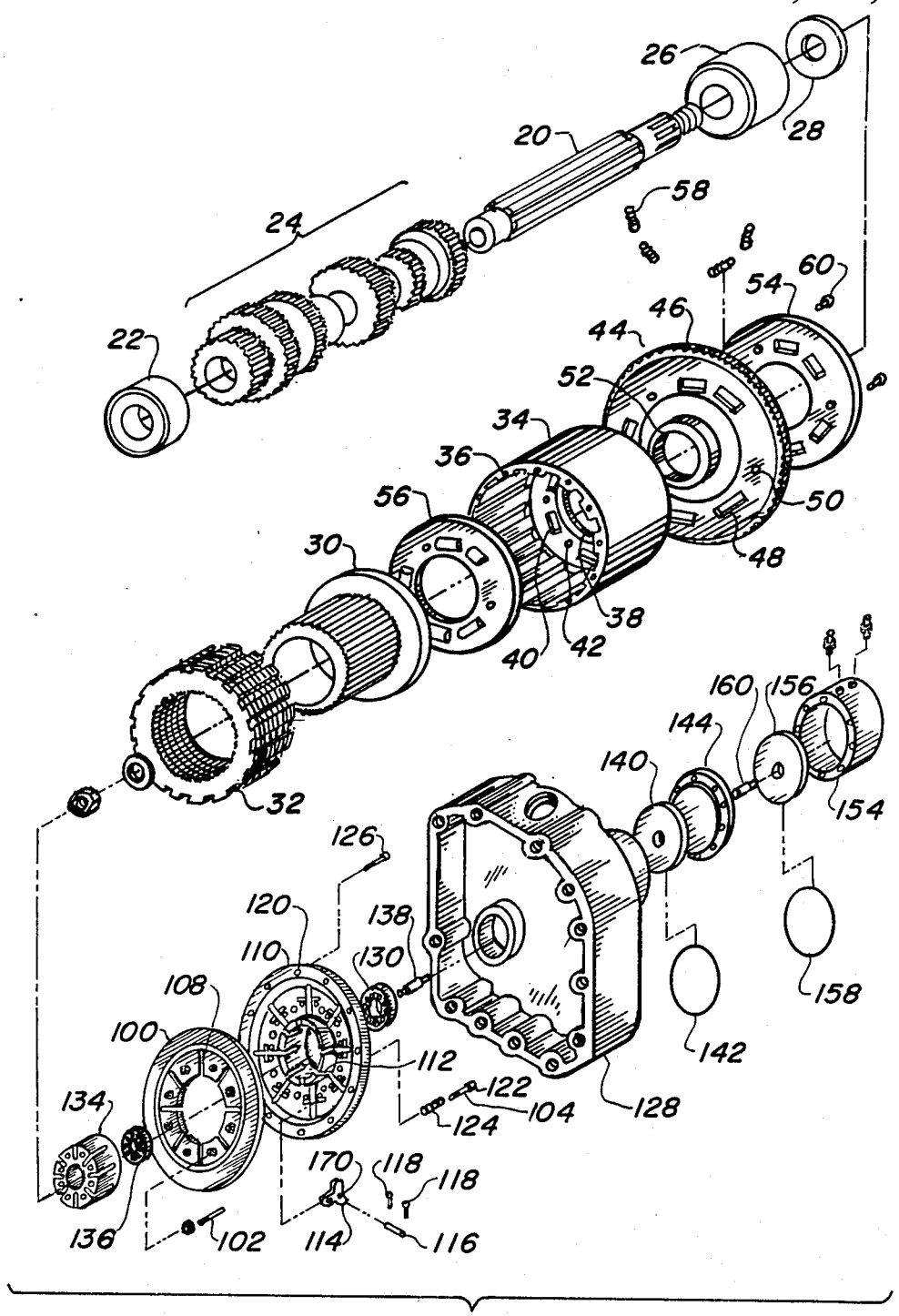
FIG. 3 is an exploded view of the slider clutch with all of the elements used from the original equipment manufacture and the inventors prior patent.

The best mode for carrying out the invention is presented in terms of a preferred embodiment. The preferred embodiment, as shown in FIGS. 1 through 15, is comprised of a combination of original equipment manufacturer components, aftermarket components and new elements added to form the improvement. The motorcycle manufacturers parts are illustrated in FIGS. 1 through 3 and consist of a transmission output shaft 20, including a front bearing 22, the entire transmission gear cluster 24, with all necessary gears, jaws, bearings and springs, the main bearing assembly 26 including the thrust washer 28. The center hub 30 and a plurality of alternately nested clutch friction disks and clutch pressure plates 32. The above components are depicted best in the exploded view, FIG. 3, shown in light lines with no shading for differentiation with the others.

The elements used by the inventors previous patent and now available as an aftermarket product, consist of a slider basket 34 with attaching holes 36, a bearing opening 38, a series of spring slots 40 and rivet holes 42. Also included is a spring loaded housing gear assembly 44 containing a housing gear 46, a number of retaining slots 48, clearance holes 50, and a bearing receiving opening 52 in the center thereof. Further, an outside backing plate 54 and inside backing plate 56 is included having springs 58 and rivets 60 therebetween. For convenience the element reference numbers 20-60 are the same as the inventors previous U.S. Pat. No. 4,732,251.

Figures 9, 10:
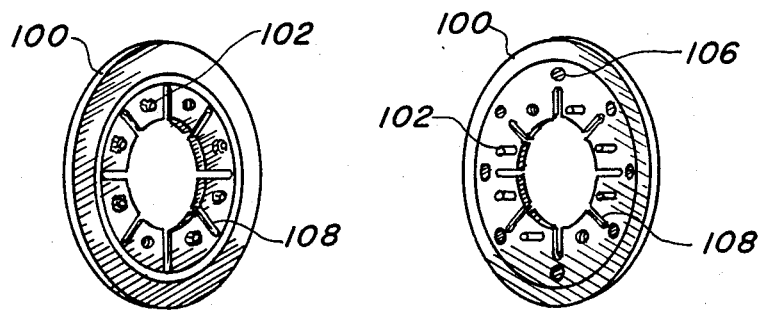
FIG. 9 is a partial isometric view of the pressure plate viewed from the clutch side, completely removed from the invention for clarity.
FIG. 10 is a partial isometric view of the pressure plate viewed opposite the clutch side, completely removed from the invention clarity.

The new elements consist of a pressure plate 100 that is juxtaposed with the friction discs and plates 32, shown removed from the invention in FIGS. 9 and 10, and exploded in FIG. 3. This pressure plate 100 is basically flat and circular in shape, preferably beveled on the edge with a hole in the middle. A number of studs 102 are attached to the plate 100 in a circular pattern and extend outwardly away from the discs and plates 32. In at least two places in the same pattern, a pair of threaded spring loaded fasteners 104 are connected thereto protruding in the same direction. Further, a plurality of hardened steel wear pads 106 are embedded into the surface between the extending studs 102, best depicted in FIGS. 2 and 10, for creating a surface interface having minimal wear potential. A number of equidistant spaced pressure plate penetrating slots 108 are positioned in radial fashion on the inside of the plate.

A basket enclosing flange 110 is attached to the slider basket 34 with the pressure plate 100 enclosed inside. A series of flange penetrating cavities 112 mating with the pressure plate slots 108 create an open void between both elements. A number of rotatable counter-balanced fingers 114 are located within the void and rotatably attached to the basket enclosing flange 110 with attaching hardware, preferably a pin 116 held in place with a pair of threaded screws 118. This arrangement allows the fingers 114 unrestrained radial movement for utilizing centrifugal force to provide the power for engaging the clutch, as the fingers are free to contact the pressure plate 100 directly on the wear pads 106. The power comes from the inward camming action of the fingers 114 created by centrifugal force causing the friction disks and plates 32 to be compressed together unitedly joining the slider basket 34 with the center hub 30. This action makes a union between the housing gear assembly 44 and transmission gear cluster 24 further transmitting the energy and locking-up the drive train from the engine to the wheel. Slippage during the transition is allowed making the clutch function in a smooth and uniform manner.

In order to retain the pressure plate 100 in the flange 110 in an oriented and, yet, movable manner while resisting rotational torque, the studs 102 that are attached to the pressure plate slideably mate with bores 120 in the flange 110. This movement allows the pressure plate 100 to move freely in a longitudinal direction relative to the shaft 20 and basket 34. In order to maintain the pressure plate 100 in a retracted position the pair of spring loaded fasteners 104, previously mentioned, are connected to the plate 100 and penetrate bores 120 in the flange 110 similar to the studs 102, however, the fastener 104 contains a head 122 which is on the outside of the flange 110 on the side opposite the plate 100. A compression spring 124 is located between the fastener head 122 and the flange 110 on each fastener, thereby comprising the spring loaded feature. Changing the tension on the spring 124, or spring rating, varies the speed in which the clutch begins engagement. The flange 110 is attached to the slider basket 34 with threaded fasteners, preferably screws 126. The above arrangement is best depicted in FIG. 2 in cross-section and individually in FIGS. 3, and 9 through 13.

A clutch housing cover 128 encloses the clutch and is bolted to the engine of the motorcycle. This cover 128, shown in FIG. 2 in partial cross-section and illustrated alone in FIG. 3, is normally constructed as a casting. The side of the cover toward the basket 34 contains attaching means in the form of a basket bearing 130 that is jointly pressed into the flange 110 and the cover 128. This arrangement allows the basket 34 and accompanying elements to rotate with the engine and, yet, be supported by the housing cover 128. The second side forms a hollow cylinder 132 in cup-like shape with the end open.

First stage restraining means within the flange 110 and cover 128 suppress the force created by the camming action of the fingers 114 allowing the engine to rotate in a neutral mode. This operational condition is accomplished by employing a restraining hub 134 that is slideably disposed within the center portion of the basket enclosing flange 110 that is free to slide within the flange parallel with the shaft 20. A restraining hub thrust bearing 136 has its outer race pressed into the hub 134 and the inner race pressed onto a first restraining shaft 138. This principle allows the hub 134 to rotate with the flange 110 and basket 34 while the shaft 138 remains stationary. The shaft 138, therefore, becomes the restricting spacer between the pressure plate 100 and the balance of the restraint.

The first stage pneumatic actuating means supplies the reactionary force to overcome the thrust of the fingers 114 and also provides an immediate release of the restraint allowing the clutch disks 32 to be instantly compressed together. This function is accomplished using a first restraining piston 140 slideably positioned within the hollow cylinder 132 of the housing cover 128. The piston 140 has a first O-ring seal in a groove in the periphery and is pressed into the first restraining shaft 138. A sealing partition 144 is abutted to the cover 128 enclosing the hollow cylinder 132 forming a pneumatic chamber. This piston 140 and its shaft 138 attached to the hub 134 are free to move forward and aft in the cylinder 132 due to the presence or absence of pneumatic pressure between the piston 140 and the partition 144. A first stage pneumatic solenoid valve 146 is in direct communication with the cylinder 132. The valve 146 is the three-way type having 3 separate ports in pressure communication with two of the three ports at any given time. The first port 148 is attached to a pneumatic source on the motorcycle. This source of pressure may be any type suitable for the application and is well known in the art, therefore, is not depicted in the drawings. The second port 150 on the valve 146 is attached to the chamber formed by the hollow cylinder 132 and partition 144 holding the first restraining shaft 138 against the pressure plate 100 with the hub 134 preventing movement of the plate 100 in the idle or warm-up stage of clutch operation, as depicted in FIG. 1. The valve 146 further contains a third port 152 having a quick dump attachment, also well known in the art, with the second and third port in fluid contact when the solenoid valve 146 is electrically actuated. When the solenoid valve 146 is energized, the pneumatic pressure in the chamber is rapidly released, thereby allowing the first stage of the clutch to operate, as previously described, with centrifugal force on the fingers 114 urging the friction discs and plates 32 into compression. The physical arrangement of this completed stage of operation is depicted pictorially in FIG. 14.

The second stage restraining means is also integral with the basket enclosing flange 110 and suppresses the remaining force of the fingers 114. This is accomplished using a cap 154 juxtapositioned with the partition 144 forming a second pneumatic chamber. A second restraining piston 156 having a seal in the form of a second O-ring 158 is slideably positioned in the camber formed by the cap 154 and partition 144. A second restraining shaft 160 having a first and second end is pressed into the second restraining piston 156 on the first end. The second end is slideably positioned through the center of the partition 144 creating a stop for the first shaft 138 when abutted thereto when the second piston 156 is touching the partition 144. Further, the shaft 160 allows full stroke movement of the first shaft 138 when the second piston 156 is touching the cap 154.

A second stage pneumatic actuating means supplies the reactionary force to overcome the thrust of the balance of the fingers 114 in a gradual manner allowing a predetermined release of the pressure to the friction discs 32 from the pressure plate 100. This is accomplished utilizing a second stage pneumatic solenoid valve 146a identical to the first valve 146, except a bleed down orifice 162 is employed in the third port 152a, instead of the quick dump feature with either one similarly vented to atmosphere. The first port 148a and second port 150a are identical in form and function. The mode of operation is the same, except the second shaft 160 blocks the first shaft 138 and when the third port 152a is opened the pneumatic pressure is relieved in a gradual, deliberate manner due to the restriction of the orifice 162 allowing the force of the fingers 114 to actuate the clutch progressively until fully engaged.

Figure 4:
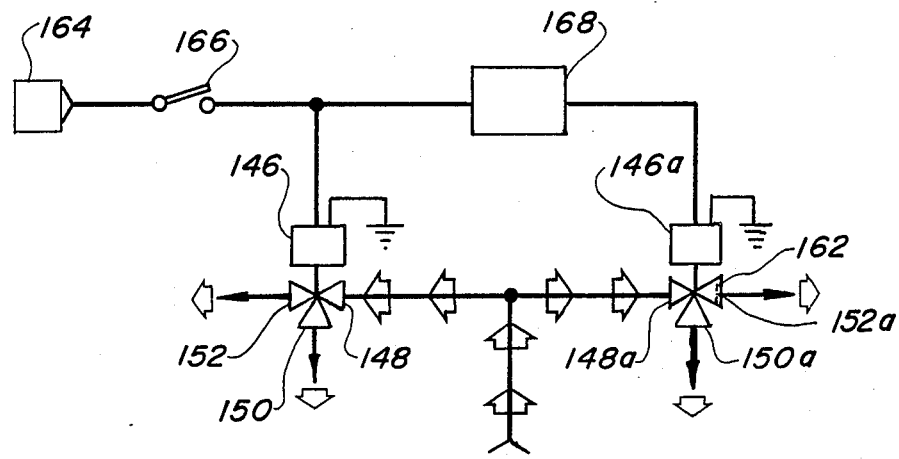
FIG. 4 is a schematic diagram of the electrical system and the pneumatic control system for the clutch.

Control means sequence the pneumatic actuating means by the use of electrical power available on the motorcycle. The control means provide the time interval signals to create an instantaneous partial engagement of the clutch in the first stage and a timed release in the second stage until the clutch is fully operable. The control means are illustrated in FIG. 4 and consist of a direct current (D.C.) electrical power source 164, which is part of the motorcycle ignition system, and a switch 166, preferably a single pole single throw-type, which is connected to the power source 164 for interrupting the power when not required. Finally, the switch 166 is connected directly to the first stage pneumatic solenoid valve 146 and jointly to an adjustable millisecond timer 168, which, in turn, is joined to the second stage pneumatic solenoid valve 146a. When the switch 166 is closed (made), the first solenoid valve 146 is actuated and the timer 168 allows an infinitely short duration of time to laps before the second solenoid 146a is energized through the timer, providing an adjustable step control sequence.

Figures 5, 6, 7, 8:
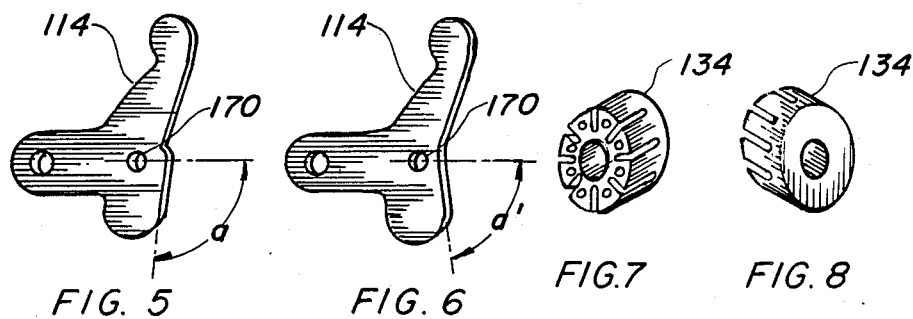
FIG. 5 is a partial isometric view of one of the counterbalanced fingers completely removed from the invention for clarity.
FIG. 6 is a partial isometric view of one of the counterbalanced fingers, as in FIG. 5, in a different configuration completely removed from the invention for clarity.
FIG. 7 is a partial isometric view of the restraining hub viewed from the clutch side, completely removed from the invention for clarity.
FIG. 8 is a partial isometric view of the restraining hub viewed opposite the clutch side, completely removed from the invention for clarity.

The counterbalanced fingers 114 may be fabricated in a wide variation of weights and configurations, with FIGS. 5 and 6 showing such a difference. The angle from the hole 170 in the finger 114 to the surface that touches the pads 106 on the pressure plate 100, designated a and a', produce a different thrust upon the plate 100 when rotated allowing a pre-selected pressure sequence to be obtained. Further, additional weights may be added to the lobe opposite the hole 170 to achieve an additional variation in rotational speed versus thrust characteristics.

The preferred construction of the clutch is using aluminum as the base material, except for the hardware, pads 106 and fingers 114, which are steel, however, any material may be used with equal ease.

In operation the motorcycle is warmed-up without the clutch being engaged, as the pressure plate 100 is held captive in it's movement by pneumatic pressure in the chamber formed by the cylinder 132 and partition 144 reacting upon the piston 140 and shaft 138. When the clutch is to be energized, the operator closes the switch 166, which powers the solenoid coil, and opens the respective ports on the first solenoid valve 146, allowing the pressure to vent to atmosphere through the quick dump action permitting the fingers 114 on the flange 110 to exert pressure on the plate 100 partially compressing the friction disks 32 completing the first stage. A few milliseconds later the timer 168 allows the second solenoid 146a to vent the pressure in the second chamber formed in the cap 154 and partition 144 through an orifice 162 permitting the second piston 156 and shaft 160 to slide rearwardly away from the plate 100. This action lets the fingers 114 continue to exert the force created by centrifugal action to the friction disks 32 completing the engagement of the clutch.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:
1. An improved multi-stage motorcycle adjustable slider clutch utilizing original equipment manufacturers transmission output shaft, front bearing, transmission gear cluster main bearing assembly, thrust washer, center hub and a plurality of nested clutch friction discs and plates, also an aftermarket slider basket and a spring loaded housing gear assembly having the main bearing assembly joined into the housing gear forming a rotational bearing receptacle the improvement comprising;
 (a) a pressure plate contiguous with the friction discs, urging the discs together during torque transmitting actuation;
 (b) a basket enclosing flange having a plurality of rotatable counterbalanced fingers extending therethrough, the flange further attached to the basket such that the pressure plate is enclosed inside and the fingers are in intimate contact with the pressure plate urgingly forcing the pressure plate into contact with the friction discs and plates to compress together unitedly joining the slider basket member with the center hub making union between the housing gear assembly and transmission gear cluster at the same approximate rotational speed as the housing gear assembly, less slippage;
 (c) a clutch housing cover having rotatable attaching means on a first side and a second side defining a hollow cylinder, therein with the attaching means interfacing between the enclosing flange and the housing cover allowing the enclosed basket member to be supported;
 (d) first stage restraining means within the basket enclosing flange and housing cover suppressing the force created by the camming action of the counterbalanced fingers allowing the motorcycle engine to rotate in a neutral condition;
 (e) first stage pneumatic actuating means contiguous with the restraining means supplying the reactionary force to overcome the thrust of the fingers, also providing an immediate release of the restraint allowing the clutch friction discs and plates to be instantly compressed together by the action of a specific number of fingers balancing the torque of the motorcycle engine with the coefficient of friction of the motorcycle engine with the coefficient of friction of the motorcycle wheels relative to the surface upon which the motorcycle is resting;
 (f) second stage restraining means integral with the basket enclosing flange suppressing the remaining force created by the balance of the fingers defining positive control thereof;
 (g) second stage pneumatic actuating means contiguous with the restraining means supplying the reactionary force to overcome the thrust of the balance of the fingers in a gradual manner allowing a predetermined release of the constraints such that the motorcycle engine torque does not further overcome the coefficient of friction of the motorcycle wheels; and,
 (h) control means in communication with said first and second stage pneumatic actuating means providing an instantaneous partial engagement of the clutch in the first stage, and a timed sequential second stage modulated engagement therewith.

2. The slider clutch as recited in claim 1 further comprising a plurality of studs affixed to said pressure plate, further said basket enclosing flange having a plurality of bores disposed therein with the studs slidingly interfacing into the bores defining a movable aligned union therebetween, also said pressure plate having at least a pair of spring loaded threaded fasteners attached thereto and said flanged having mating bores engagingly receiving the fasteners such that the plate is attracted to the flange under the influence of the springs until said fingers force the pressure plate into engagement with said friction discs and plates.

3. The slider clutch as recited in claim 1 wherein said pressure plate further comprises a plurality of hardened steel wear pads disposed in alignment with each finger creating a surface interface with minimal wear potential.

4. The slider clutch as recited in claim 1 further comprising said basket enclosing flange having a cavity for each finger and attaching hardware including a pin and threaded screws allowing containment of the fingers and radial movement, thus utilizing centrifugal force for powering the clutch.

5. The slider clutch as recited in claim 1 wherein said clutch housing cover rotatable attaching means further comprise a basket bearing jointly pressed into said basket enclosing flange and said clutch housing cover allowing said basket to rotate freely when attached to the flange upon rotation of the motorcycle engine.

6. The slider clutch as recited in claim 1 wherein the first stage restraining means further comprise,
a restraining hub slidingly disposed within said basket enclosing flange,
a restraining hub thrust bearing having an inner and outer race with the outer race pressed into the restraining hub, and
a first restraining shaft having a first and second end with the first end pressed into the thrust bearing inner race allowing the outer race to rotate with the basket and the shaft to not rotate, also further defining a restricting spacer between the pressure plate and the first stage pneumatic actuating means restraining the pressure plate until purposely released.

7. The slider clutch as recited in claim 6 wherein the first stage pneumatic actuating means further comprise,
a first restraining piston, having a seal, slideably positioned within the hollow cylinder of the clutch housing cover and pressed onto the first restraining shaft,
a sealing partition abutted to the second side of the clutch housing cover over the hollow cylinder forming a pneumatic chamber,
a first stage pneumatic solenoid valve having three ports, the valve attached to a pneumatic source on a first port for supplying pneumatic pressure, and a second port in communication with the chamber, holding the first restraining shaft and hub against the pressure plate preventing movement therefrom with a third port having a quick dump allowing the pressure within the chamber to be rapidly relieved to energize the first stage of the centrifugal clutch by allowing the pressure plate to be affected by the force of the fingers within a controlled limit thus starting the engagement of the clutch.

8. The slider clutch as recited in claim 7 wherein the second stage restraining means further comprise,
a cap juxtapositioned with said partition jointly attached to the clutch housing cover forming a second pneumatic chamber,
a second restraining piston having a seal slideably positioned within the second chamber freely movable therein,
a second restraining shaft having a first and second end with the first end pressed into the second restraining piston and the second end slideably penetrating the partition created a stop for the first shaft when abutted thereto when the second piston is contiguous with the partition and allowing full stroke movement of the first shaft when touching the cap end.

9. The slider clutch as recited in claim 8 wherein the second stage pneumatic actuating means further comprise,
a second stage pneumatic solenoid valve having three ports, a first port attached to a pneumatic source, a second port in communication with said second pneumatic chamber and a third port having a bleed down orifice therein vented to atmosphere, the valve allowing the pneumatic pressure to force the second restraining piston against the partition with its accompanying second shaft blocking the movement of the first shaft, further when the third port is opened the pneumatic pressure is relieved in a time controlled manner gradually allowing the force of the fingers to actuate the clutch in a second stage mode of operation.

10. The slider clutch as recited in claim 9 wherein said control means further comprise,
a direct current electrical power source interruptably connected to said pneumatic solenoid valves,
a switch for energizing the electrical power to the first pneumatic solenoid valve, and
a millisecond timer electrically joined to said switch and said second pneumatic solenoid valve such that when the switch is made the first solenoid valve is actuated and the timer allows an infinitely short duration of time to lapse before the second solenoid is energized providing a step control sequence in the clutch engaging continuance procedure.

11. The slider clutch as recited in claim 1 wherein said counterbalanced fingers further comprise a variation in configuration allowing a predetermined amount of force to be exerted against the pressure plate according to the motorcycle engine speed providing step control by mating fingers.

12. The slider clutch as recited in claim 1 further comprising aluminum as the base material for the entire clutch, except for the fingers with mating surface and mounting hardware.

* * * * *